(12) United States Patent
Custy

(10) Patent No.: US 7,245,292 B1
(45) Date of Patent: Jul. 17, 2007

(54) APPARATUS AND METHOD FOR INCORPORATING TACTILE CONTROL AND TACTILE FEEDBACK INTO A HUMAN-MACHINE INTERFACE

(75) Inventor: Edward John Custy, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 438 days.

(21) Appl. No.: 10/663,945

(22) Filed: Sep. 16, 2003

(51) Int. Cl.
G09G 5/00 (2006.01)
G06F 3/041 (2006.01)

(52) U.S. Cl. .................... 345/173; 178/18.01

(58) Field of Classification Search ........ 345/173–180; 340/407.1, 407.2; 434/113; 178/18.01
See application file for complete search history.

(56) References Cited

U.S. PATENT DOCUMENTS

| | | |
|---|---|---|
| 5,165,897 A | 11/1992 | Johnson |
| 5,184,319 A | 2/1993 | Kramer |
| 5,736,978 A | 4/1998 | Hasser et al. |
| 6,128,671 A | 10/2000 | Weijand |
| 6,218,966 B1 | 4/2001 | Goodwin et al. |
| 6,354,839 B1 * | 3/2002 | Schmidt et al. ............. 434/113 |
| 6,473,069 B1 | 10/2002 | Gerpheide |
| 6,693,516 B1 * | 2/2004 | Hayward ................. 340/407.1 |
| 6,703,924 B2 * | 3/2004 | Tecu et al. ............... 340/407.1 |
| 7,009,595 B2 * | 3/2006 | Roberts et al. ............. 345/156 |

* cited by examiner

Primary Examiner—Kevin M Nguyen
(74) Attorney, Agent, or Firm—J. Eric Anderson; Michael A. Kagan; Peter A. Lipovsky

(57) ABSTRACT

A tactile user interface device that allows a user to manipulate the graphical elements of a graphical user interface and provides tactile feedback to the user. The interface device comprises a substrate and a plurality of tactile elements. Each tactile element of the tactile user interface device comprises a means for sensing pressure from a user's finger to determine if the user has depressed the tactile element and a means for conveying tactile feedback information to the user. Tactile feedback information may be elevations, vibrations, textures, and temperatures.

2 Claims, 5 Drawing Sheets

APPARATUS AND METHOD FOR INCORPORATING TACTILE CONTROL AND TACTILE FEEDBACK INTO A HUMAN-MACHINE INTERFACE

BACKGROUND OF THE INVENTION

The invention relates generally to human-machine interface devices. More specifically, the invention relates to an enhanced track pad that allows a user to manipulate the graphical elements of a graphical user interface (GUI) and provides tactile feedback to the user.

Current computer systems allow graphical elements such as windows, icons, and menus to be manipulated through the use of a pointer controlled by a mouse. This interface allows an operator to indicate a single point on the display and to click (or double-click, etc.) one or more buttons on the mouse. The only feedback that the user receives about the success of an intended operation is through the visual display provided by the computer screen.

Like a conventional track pad, a mouse-controlled pointer provides only an indirect way of manipulating the elements of a GUI. Users cannot move a graphical icon or window directly with their hands, the way they would move a piece of paper sitting on a real desktop. Rather, users must operate on elements of a GUI through the intermediary action of a mouse, which only allows users to point and click. Furthermore, a conventional mouse provides no tactile feedback about the operations being performed on the GUI. The only feedback that a user receives about the setup and execution of an intended operation is through the video display. Thus, information transfer between a computer and a human operator is less than optimal.

A touch screen video display would seem to remedy some of these deficiencies. A touch screen display allows a computer operator to directly "reach out and touch" the item to be manipulated, without any intermediary mechanisms. However, touch screens have their own deficiencies, which limit the rate of information transfer between the computer and human operator. Graphical elements have to be of roughly the same size as a human fingertip, which is wasteful of screen real estate, and fingers tend to obscure the graphical elements to be manipulated. Fingerprints, smudges, and other marks on the screen provide a constant distraction. Also, current touch screen video displays, like conventional track pads and mouse-controlled pointers, provide no tactile feedback of any kind to users.

Thus, there is a need for a device that incorporates control and tactile feedback, which allows a more optimal interface between the user and the machine.

SUMMARY OF THE INVENTION

The invention relates to an enhanced track pad that allows a user to manipulate the graphical elements of a graphical user interface and provides tactile feedback to the user.

The enhanced track pad comprises a substrate and a plurality of tactile elements. Each tactile element of the tactile user interface device comprises a means for sensing pressure from a user's finger to determine if the user has depressed the tactile element and a means for conveying tactile feedback information to the user.

A user views a video display and provides inputs or commands to a computer or processor through the enhanced track pad. The user uses the enhanced track pad to manipulate elements of the graphical user interface in a similar fashion as one would use a conventional track pad to operate on the video display's graphical elements. Additionally, the enhanced track pad provides the user with enhanced sensory information about the GUI elements on the display, including the relationship between the user's hand and the GUI elements. In operation, the user rests his hand on the enhanced track pad, and a representation of the user's hand appears on the video display. Tactile feedback information, such as elevations, vibrations, wave-like undulations, textures, and temperatures, which correspond to the graphical elements on the video display, are felt by the user's finger on the enhanced track pad. Using tactile feedback information, the user then performs operations such as selecting GUI elements by "tapping" on the enhanced track pad.

BRIEF DESCRIPTION OF THE DRAWINGS

For a more complete understanding of the enhanced track pad, reference is now made to the following detailed description of the embodiments as illustrated in the accompanying drawings, wherein.

DESCRIPTION OF THE EMBODIMENTS

Figure 1:
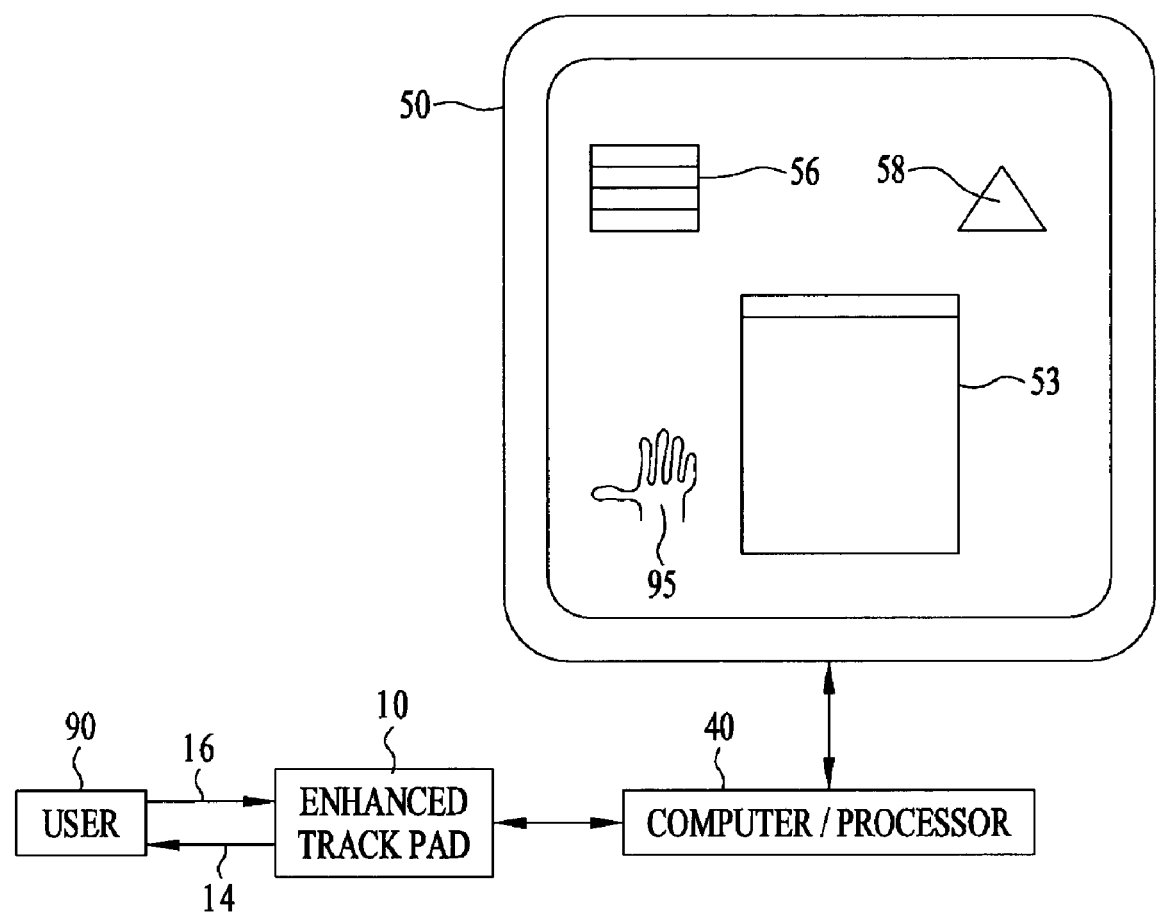
FIG. 1 illustrates the operation of the enhanced track pad.

FIG. 1 shows a schematic representation of the enhanced track pad 10 in operation. A user 90 views a video display 50 and provides inputs or commands 16 to the computer or processor 40 through the enhanced track pad 10. The user 90 uses the enhanced track pad 10 to manipulate elements 53, 56, 58 of the graphical user interface (GUI) in a similar fashion as one would use a conventional track pad to operate on the video display's graphical elements. Additionally, the enhanced track pad 10 provides the user 90 with enhanced sensory information about the GUI elements 53, 56, 58 on the display 50, including the relationship between the user's hand and the GUI elements 53, 56, 58. In operation, the user 90 rests his hand on the enhanced track pad 10, and a representation 95 of the user's hand appears on the video display 50. The representation 95 of the user's hand provides additional visual feedback to the user 90 and need not be to scale. Tactile feedback information 14, such as elevations, vibrations, wave-like undulations, textures, and temperatures, which correspond to the graphical elements 53, 56, 58 on the video display 50, are felt by the user's finger on the enhanced track pad 10. Using tactile feedback information 14, the user 90 then performs operations such as selecting GUI elements 53, 56, 58 by "tapping" on the enhanced track pad 10.

Figure 2:
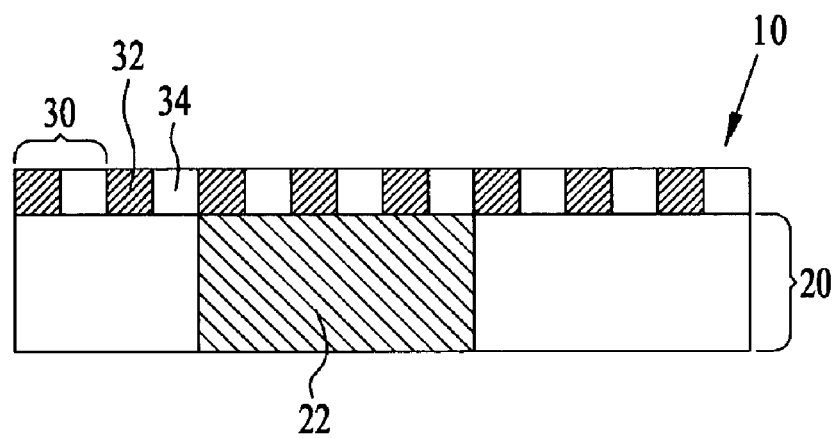
FIG. 2 is a schematic drawing of the enhanced track pad.

As shown in the schematic drawing of FIG. 2, the enhanced track pad 10 includes a fixed substrate 20 that supports an array of tactile elements or taxels 30. Substrate 20 may also contain at least a portion of the control circuitry 22 and any other associated circuitry required. Each taxel 30 in the array receives input from a user and provides tactile feedback information to the user. To receive inputs from a user, each taxel 30 includes a means 32 for sensing pressure from a user's finger, to include devices such as piezoelectric devices and mechanical switches. To provide tactile feedback information, each taxel 30 includes a means 34 for conveying tactile feedback information to the user, to include devices such as mechanical pins and microelectromechanical (MEM) devices. Depending on applications, these devices need not be particularly small as the size of the enhanced track pad is not necessarily a constraint.

Figure 3A:
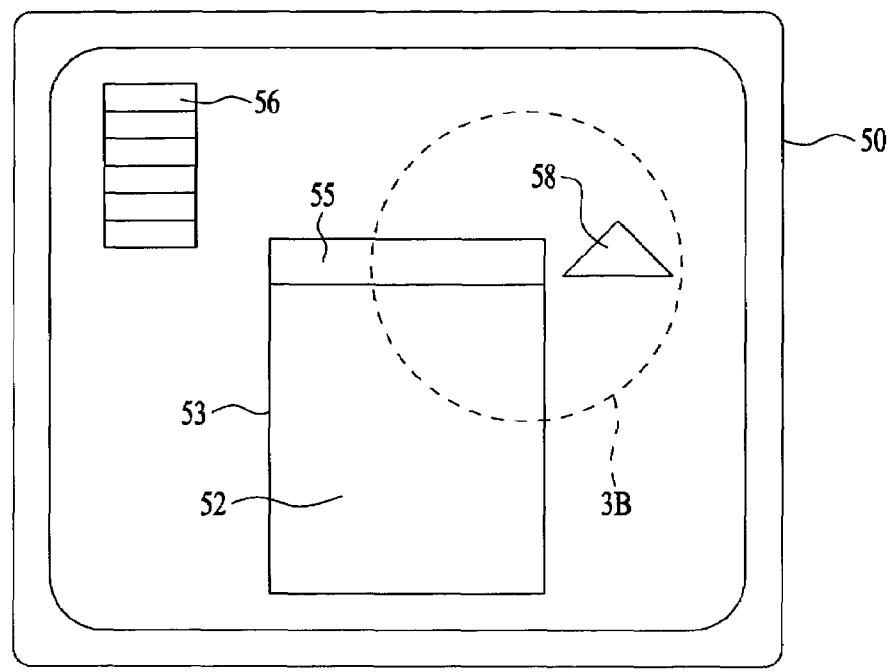
FIGS. 3A and 3B illustrate the correspondence between tactile elements on the enhanced track pad and GUI elements on a video display.
Figure 3B:
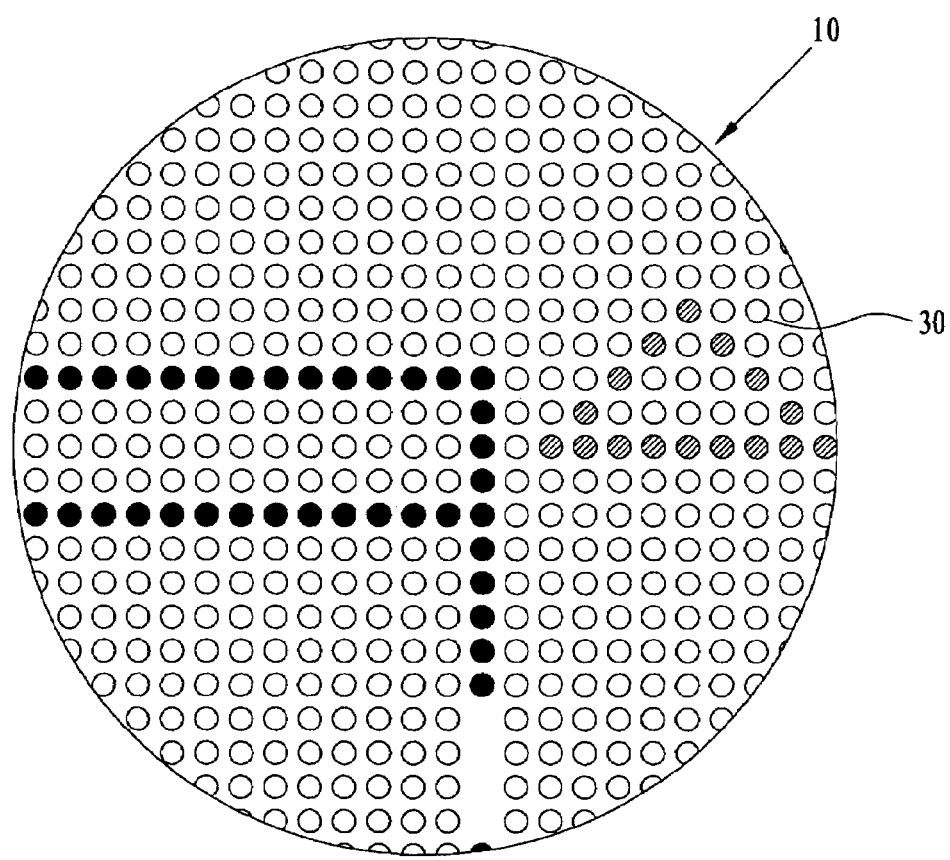

FIG. 3A and FIG. 3B illustrate how an array of taxels 30 disposed on the surface of the enhanced track pad 10 may correspond to GUI elements, such as a window 52, menu 56, and icon 58, on a video display 50. Each taxel 30 corresponds to a pixel, a fraction of a pixel, or a group of pixels on the associated video display 50. For example, each taxel 30 in the array that corresponds to the boundary of the window 52, consisting of edges 53 and a title bar 55, is raised to a particular elevation distinguish it from the windows contents and its background, which are of different elevations from the boundary. Through these elevated contours, the user is then provided with information that reinforces and is in consonance with that presented on the video display 50. The representations of the GUI elements 52, 56, 58 on a video display as described herein are used as an example only, and it is therefore to be understood that other suitable representations of GUI elements may be used.

Figure 4:
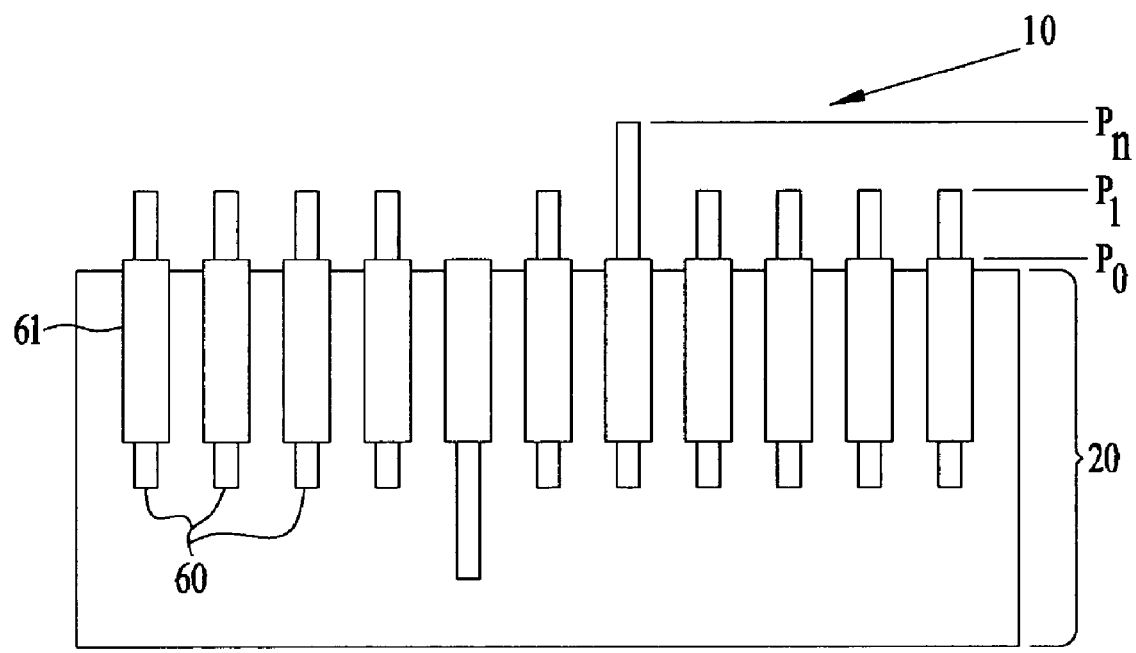
FIG. 4 is an embodiment of the enhanced track pad using an array of pins.

In one embodiment shown in FIG. 4, each taxel of the enhanced track pad 10 includes a vertical pin 60 disposed in a sleeve 61. Planar substrate 20 supports the array of vertical pins 60. In this embodiment, information is conveyed to the user by varying the elevations of the vertical pins 60. Each pin 60 is elevated to a selected pin position $p_n$ to represent different features, such as shapes and colors, of the GUI elements on the video display. The elevation of each pin 60 is selected from a plurality of pin positions $p_0, p_1, \ldots, p_n$, through the use of devices, such as piezoelectric devices or electromagnets. In another implementation of the enhanced track pad 10, tactile feedback information may be conveyed to the user through wave-like undulations or vibrations. The user performs operations such as selecting a GUI element on a video display by depressing the vertical pins 60 of the enhanced track pad 10 corresponding to the GUI element. To determine whether the user has depressed a pin, a pressure threshold is set for the vertical pins 60. When the pressure exerted on the pins 60 is less than the set pressure threshold, no inputs from the user are sent through the enhanced track pad 10. When the pressure exerted on the pins 60 exceeds the set pressure threshold, the pressure from the user's finger is interpreted as an input or a command. For example, the user will be able to locate and feel the title bar of a window by using pressure less than the pressure threshold, but will move the window from one area of the video display to another by using pressure more than the set pressure threshold.

Figure 5:
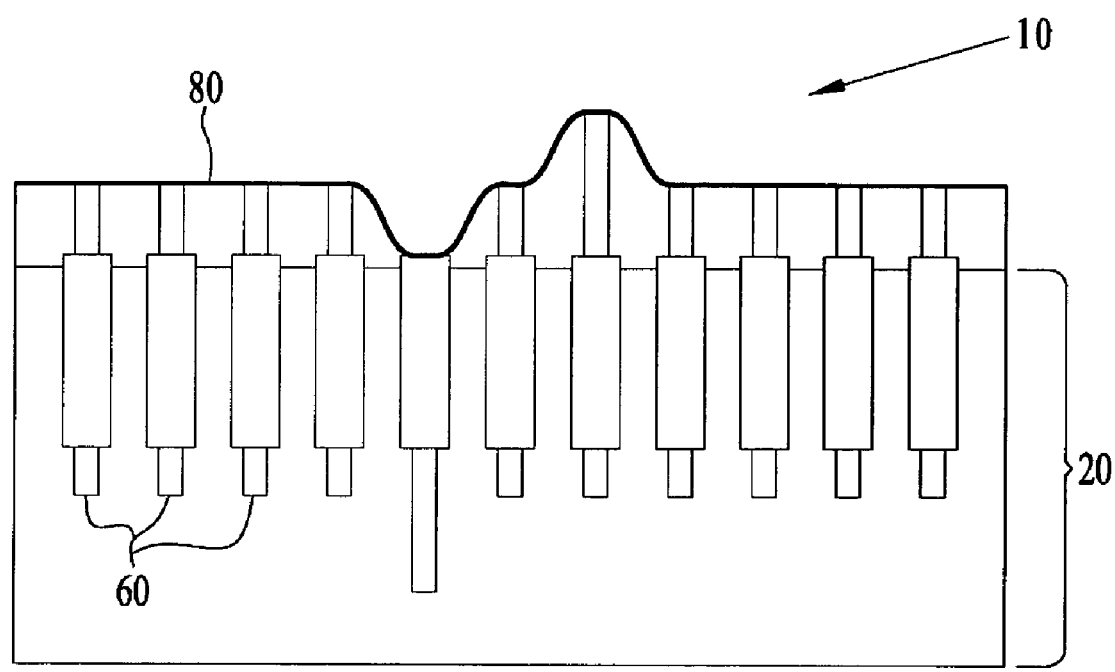
FIG. 5 shows another embodiment of the enhanced track pad with a flexible membrane disposed over an array of pins.

FIG. 5 shows another embodiment of the enhanced track pad 10. In this embodiment, the enhanced track pad comprises a fixed planar substrate 20 that supports an array of vertical pins 60, a flexible membrane 80 disposed on the array of vertical pins 60, and the array of MEM devices are disposed on the flexible membrane 80. An advantage of this embodiment is protection of the array of pins from environmental concerns such as dust, dirt, and moisture.

Figure 6:
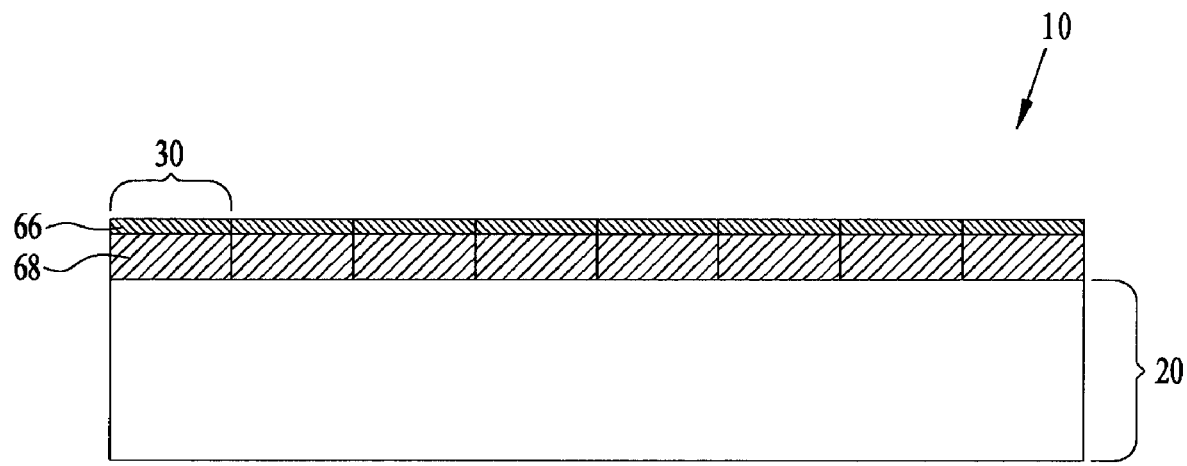
FIG. 6 shows yet another embodiment of the enhanced track pad.

In yet another embodiment shown in FIG. 6, each taxel 30 of the enhanced track pad 10 includes two devices, a device for sensing pressure to determine if the user has exerted pressure on taxel 30 and a device for providing tactile information to the user. A piezoelectric sensor 66 measures the pressure exerted on taxel 30 by the user's hand. When the piezoelectric sensor 66 measures pressure greater than a predetermined pressure threshold, the pressure from the user's finger is interpreted as an input or a command.

Still referring to FIG. 6, to provide tactile information, each taxel 30 comprises one or more microelectromechanical (MEM) devices 68, such as for example, actuators. Each MEM device 68 has at least two mechanical states, state 'a' and state 'b'. Different textures are constructed by placing the MEM devices 68 on each taxel 30 of the enhanced track pad 10 into different mechanical states. For example, by placing all of the MEM devices 68 in state 'a', a particular texture is felt by the user's fingertip moving across the enhanced track pad 10. Placing all of the MEM devices 68 in state 'b' produces a different texture. Other textures are constructed by placing different subsets of the MEM devices 68 on each taxel 30 of the enhanced track pad 10 in different configurations. For example, a static checkerboard pattern is constructed by placing a selected number of MEM devices in state 'a' alternating with a selected number of MEM devices in state 'b'. The representation of textures as described herein is used as an example only, and it is therefore to be understood that other suitable representations of textures may be used.

In addition, the MEM devices 68 disposed on each taxel 30 of the enhanced track pad 10 are not limited to switching between static configurations, as described above, to convey tactile information to the user. For example, an array of micro-mechanical cantilevers vibrating in unison at one of a plurality of frequencies may be used to convey sensory information to the user, while an array of cantilevers vibrating in a wavelike manner may be used to convey another sensory information.

In all of the embodiments described herein, information is conveyed to a human user about graphical items on a video display. However, the source of information is not limited to computers but could be any machine.

Clearly, many modifications and variations of the enhanced track pad are possible in light of the above teachings. It is therefore to be understood that within the scope of the appended claims the enhanced track pad may be practiced otherwise than as specifically described.

I claim:

1. A method for fabricating a tactile user interface device, comprising the steps of:

fabricating a substrate;

disposing a plurality of tactile elements on said substrate wherein each of said tactile elements comprises a pressure sensor disposed to determine if any of said plurality of tactile elements have been depressed;

disposing a flexible membrane on said plurality of tactile elements; and disposing on said flexible membrane a plurality of microelectromechanical devices disposed to convey tactile feedback information, wherein each of said microelectromechanical devices corresponds to one of said tactile elements.

2. A tactile user interface device, comprising:

a substrate;

a plurality of tactile elements disposed on said substrate wherein each of said plurality of tactile elements correspond to at least a fraction of a pixel on a video display and wherein each of said plurality of tactile elements comprises:

a pressure sensor disposed to indicate if any of said plurality of tactile elements have been depressed; and a feedback device disposed to convey tactile feedback information, wherein each of said feedback devices is disposed on a flexible membrane and each of said feedback devices comprises at least one microelectromechanical device, wherein said at least one microelectromechanical device has at least two mechanical states; and said flexible membrane disposed on said plurality of tactile elements.

* * * * *